(12) United States Patent
Dobashi et al.

(10) Patent No.: US 8,083,967 B2
(45) Date of Patent: Dec. 27, 2011

(54) PROCESS FOR PRODUCING GEL WITH LIQUID CRYSTAL STRUCTURE, AND GEL WITH LIQUID CRYSTAL STRUCTURE PRODUCED BY THE PROCESS

(75) Inventors: Toshiaki Dobashi, Ashikaga (JP); Takao Yamamoto, Kiryu (JP); Kazuya Furusawa, Maebashi (JP)

(73) Assignee: National University Corporation Gunma University, Gunma (JP)

( * ) Notice: Subject to any disclaimer, the term of this patent is extended or adjusted under 35 U.S.C. 154(b) by 248 days.

(21) Appl. No.: 12/225,264

(22) PCT Filed: Mar. 23, 2007

(86) PCT No.: PCT/JP2007/055957
§ 371 (c)(1),
(2), (4) Date: Jul. 30, 2009

(87) PCT Pub. No.: WO2007/111232
PCT Pub. Date: Oct. 4, 2007

(65) Prior Publication Data
US 2009/0302271 A1 Dec. 10, 2009

(30) Foreign Application Priority Data

Mar. 24, 2006 (JP) ................................. 2006-083289

(51) Int. Cl.
*C09K 19/06* (2006.01)
*C09K 19/54* (2006.01)
*C08J 3/075* (2006.01)
*C08L 5/00* (2006.01)
(52) U.S. Cl. ............. 252/299.01; 252/299.5; 252/299.6; 516/31; 516/900
(58) Field of Classification Search ............. 252/299.01, 252/299.5, 299.6; 516/31, 900
See application file for complete search history.

(56) References Cited

U.S. PATENT DOCUMENTS

2008/0128652 A1* 6/2008 Dobashi et al. ............ 252/299.6
2009/0192299 A1* 7/2009 Chromy et al. ................ 530/402

FOREIGN PATENT DOCUMENTS

| JP | 2001-081098 | 3/2001 |
| JP | 2002-018270 | 1/2002 |
| JP | 2006-096987 | 4/2006 |
| JP | 2007-084615 | 4/2007 |
| WO | WO 02/10262 A1 | 2/2002 |
| WO | WO 2006/025244 A1 | 3/2006 |

* cited by examiner

*Primary Examiner* — Shean Wu
(74) *Attorney, Agent, or Firm* — Hogan Lovells US LLP

(57) ABSTRACT

A water-insoluble liquid crystalline gel composed mainly of a water-soluble polymer, itself having a gelation function together with a liquid crystal formation function and having an optical property is produced.

First, the water-soluble polymer is dissolved in water or an aqueous solution containing a salt(s) to prepare a polymer solution. Subsequently, this polymer solution is dialyzed in an aqueous solution containing a chemical crosslinking agent, thereby obtaining the gel having a liquid crystal structure and composed mainly of the water-soluble polymer. Said water soluble polymer is one or two or more polymers selected from the group consisting of water-soluble biopolymers, derivatives of these water-soluble biopolymers and water-soluble synthesized polymers. The water-soluble biopolymers are one or two or more polymers selected from the group consisting of nucleic acids, polysaccharides, proteins, modified proteins and polyamino acids. The water-soluble synthesized polymers are one or two or more polymers selected from the group consisting of polyvinyl alcohol, polyethylene glycol, polyacrylic acid and polystyrene sulfonic acid.

14 Claims, 10 Drawing Sheets
(4 of 10 Drawing Sheet(s) Filed in Color)

Comparative Example 10

Example 22

PROCESS FOR PRODUCING GEL WITH LIQUID CRYSTAL STRUCTURE, AND GEL WITH LIQUID CRYSTAL STRUCTURE PRODUCED BY THE PROCESS

CROSS-REFERENCE TO THE RELATED APPLICATIONS

This application is a national stage of international application No. PCT/JP2007/055957 filed Mar. 23, 2007, which also claims the benefit of priority under 35 USC 119 to Japanese Patent Application No. 2006-083289 filed Mar. 24, 2006, the entire contents of which are incorporated herein by reference.

TECHNICAL FIELD

The present invention relates to a process for producing a gel with a liquid crystal structure (hereinafter referred to as a "liquid crystalline gel") by dialyzing or immersing various polymer solutions in an aqueous solution of a chemical crosslinking agent, and the liquid crystalline gel produced by this process.

BACKGROUND ART

It is well-known that DNA (deoxyribonucleic acid) has a double helix structure. DNA in aqueous solution is classified into an electrolyte polymer with a continuous length of about 500 angstroms having a negative charge every about 1.5 angstroms. It is also known that a base pair layer and a major groove in the double helix structure of DNA have a selective absorptivity of an aromatic compound having a planer chemical structure.

Conventionally, the process has been disclosed in which a water-insoluble crosslinked polymer of the water-soluble DNA is immobilized on a support by irradiating ultraviolet light with a wavelength of 250 to 270 nm to an aqueous solution of the water-soluble DNA (e.g., DNA derived from salmon sperm) or a liquid film thereof on the support, or a thin layer of the water-soluble DNA on the support, or a thin layer obtained by concentrating or drying the liquid film of the water-soluble DNA on the support (e.g., see Patent Document 1). According to this process, the ultraviolet light causes a crosslinking reaction of the DNA derived from the salmon sperm to insolubilize in water, and a carcinogenic substance and an endocrine disturbing chemical composed of the aromatic compound having the planer chemical structure can be absorbed by this insolubilization technology.

Meanwhile, the present applicant applied the process for producing a liquid crystalline gel by dialyzing the solution of the polymer such as curdlan and DNA in the aqueous solution of a metal cation for a patent (see Japanese Patent Application 2004-249638, International Patent Application PCT/JP2005/015395). Among these liquid crystalline gels produced by the dialysis, in particular, the liquid crystalline gel composed of the curdlan is expected to be practically applied to optical parts and drug carriers because of its characteristic liquid crystal structure. The liquid crystalline gel composed of DNA is expected to be practically applied to environmental purification materials by taking advantage of its absorbable function of environmental pollutants.

Patent document 1: JP 2001-81098 (Claims, [0019], [0022])

DISCLOSURE OF INVENTION

Problem to be Solved by the Invention

However, in the process for producing the water-insoluble DNA crosslinked body by ultraviolet light irradiation, described in the above conventional patent Document 1, since the DNA is crosslinked using the ultraviolet light, it is necessary to irradiate the ultraviolet light to the DNA for a long time. Thus, the process is not suitable for a mass production. This process cannot produce the liquid crystalline gel so that the polymer itself having the optical property has a gelation function together with a liquid crystal formation function like in the present invention.

In the above process for producing the liquid crystalline gel applied by the present applicant, the gel is conceivable to be a physical gel attributed to physical bonds such as a coulomb force and a hydrogen bond between a metal ion and the polymer. Thus, if the gel is kept in water for a long time, it is likely that physical properties such as elastic modulus and birefringence are reduced by elution of the metal ion.

A first object of the present invention is to provide a process for producing a water-insoluble liquid crystalline gel composed mainly of various water-soluble polymers, itself having the gelation function together with the liquid crystal formation function and having the optical property, and the liquid crystalline gel.

A second object of the present invention is to provide a process for producing a liquid crystalline gel capable of obtaining relatively stable liquid crystal physical property and dynamic property for an external environment by dialyzing or immersing a polymer solution in an aqueous solution containing a chemical crosslinking agent, and the liquid crystalline gel.

A third object of the present invention is to provide a process for producing a liquid crystalline gel, in which a liquid crystalline gelation of the polymer using the chemical crosslinking agent, which has been impossible by the conventional art, is made possible, and the liquid crystalline gel composed mainly of the water-soluble polymer can be produced inexpensively and massively.

Means for Solving Problem

According to one aspect, the present invention includes is a process for producing a gel comprising a step of dissolving a water-soluble polymer in water or an aqueous solution containing a salt(s) to prepare a water-soluble polymer solution and a step of dialyzing said polymer solution in an aqueous solution containing a chemical crosslinking agent, thereby obtaining the gel composed mainly of the water-soluble polymer and having a liquid crystal structure, characterized in that the water-soluble polymer is one or two or more polymers selected from the group consisting of water-soluble biopolymers, derivatives of these water-soluble biopolymers and water-soluble synthesized polymers, the water-soluble biopolymers are one or two or more polymers selected from the group consisting of nucleic acids, polysaccharides, proteins, modified proteins and polyamino acids, water-soluble synthesized polymers are one or two or more polymers selected from the group consisting of polyvinyl alcohol, polyethylene glycol, polyacrylic acid and polystyrene sulfonic acid, the chemical crosslinking agent is one or two or more selected from the group consisting of formaldehyde, glutaraldehyde, ethylene glycol diglycidyl ether and epichlorohydrin, and the step of obtaining the gel having the liquid crystal structure comprises a step of filling and sealing the polymer solution in a dialysis tube composed of a semipermeable membrane, a step of forming a cylindrical gel having a concentric multilayered structure when a cross section perpendicular to a longitudinal direction of the tube is observed, in the tube, by repeating transferring the tube together with the above aqueous solution to a second incubator in which the temperature is kept lower than in a first incubator and dialyzing the polymer solution in the tube in the second incubator and further transferring again the tube together with the above aqueous solution to the first incubator and dialyzing the polymer solution in the tube in the first incubator, after immersing the tube in which the polymer solution has been filled in the aqueous solution containing the chemical crosslinking agent to dialyze the polymer solution in the tube in the first incubator kept at a predetermined temperature and subsequently, and a step of obtaining a solid-core columnar or hollow-core cylindrical gel by taking out the above gel from the tube and rinsing the gel with the water.

The "liquid crystalline gel" in the present invention refers to those where the water-soluble polymer in an aggregation state is the liquid crystal and simultaneously the gel.

One aspect of the present invention includes producing a gel having cylindrical, spherical, platy, film-like, rod-like or fibrous liquid crystal structure composed of a water-soluble polymer.

Effect of the Invention

In one aspect of the process for producing the liquid crystalline gel according to the present invention, the cylindrical liquid crystalline gel is formed by dissolving the water-soluble polymer in the water or the aqueous solution containing the salt(s) to prepare the water-soluble polymer solution and dialyzing this polymer solution in an aqueous solution containing the chemical crosslinking agent. This liquid crystalline gel is insoluble in the water, and is characterized in that the polymer itself has the gelation function together with the liquid crystal formation function.

The dynamic property and the optical property in the above liquid crystalline gel can be controlled by changing a concentration of the salt(s), the concentration of the water-soluble polymer and the concentration of the chemical crosslinking agent upon the production. The water-insoluble liquid crystalline gel is obtained by a simple manipulation that the polymer solution is dialyzed in the aqueous solution containing the chemical crosslinking agent. This process is suitable for the mass production as well as can be practically applied to liquid crystalline gelation technology of broad polymers.

The liquid crystalline gel composed mainly of the water-soluble polymer according to one aspect of the present invention is formed into the cylindrical, spherical, platy, film-like, rod-like or fibrous shape, and the polymer is radially oriented from the center when the cross section perpendicular to a longitudinal direction, a diameter cross section, a plate surface or a film surface is observed. First, since this liquid crystalline gel is a chemical gel prepared by a chemical reaction, it is possible to prevent the reduction of the mechanical property and the optical property, which has been concerned in the conventional liquid crystalline gels. Second, in this liquid crystalline gel, it is possible to more effectively control the mechanical property and the optical property by changing a solvent, compared with the liquid crystalline gels prepared by the conventional art. Third, it is possible to make various materials the liquid crystalline gels by designing the polymer or the chemical crosslinking agent suitable for making the liquid crystalline gel.

The liquid crystalline gel of the present invention is the covalently bound gel whereas the liquid crystalline gel already applied by the present applicant, i.e., the liquid crystalline gel produced by dialyzing the solution of the polymer such as curdlan and DNA in the aqueous solution of the metal cation is the ionically bound gel. Thus, in the liquid crystalline gel of the present invention, the range of the polymers which can produce the liquid crystalline gel is expanded as well as the liquid crystalline gel which is tough and withstands a harsh condition can be produced.

BRIEF DESCRIPTION OF DRAWINGS

The file of this patent contains at least one drawing executed in color. Copies of this patent with color drawings will be provided by the Office upon request and payment of the necessary fee.

BEST MODES FOR CARRYING OUT THE INVENTION

Figure 1:
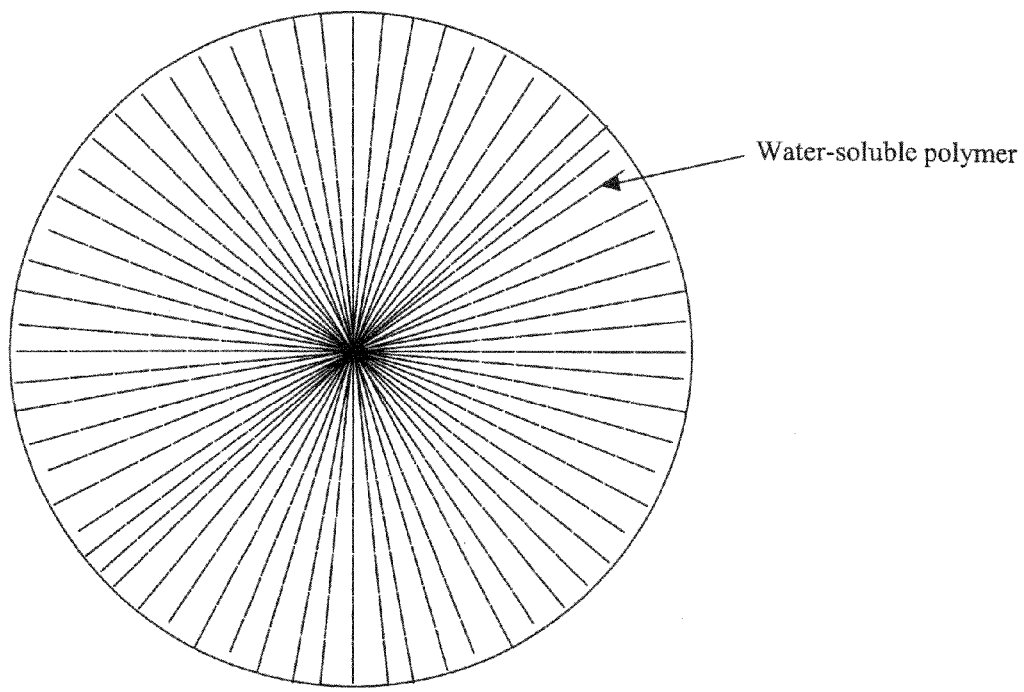
FIG. 1 is a sectional schematic view showing a molecular structure of a solid-core cylindrical liquid crystalline gel in an embodiment of the present invention.

Best modes for carrying out the present invention will be described below.

A major ingredient of the liquid crystalline gel of the present invention is one or two or more polymers selected from the group consisting of water-soluble biopolymers, derivatives of these biopolymers and water-soluble polymers. The water-soluble polymer contained in the liquid crystalline gel includes one or more polymers selected from the group consisting of nucleic acids, polysaccharides, proteins, modified proteins and polyamino acids, or derivatives thereof or combinations thereof. The nucleic acids include DNA, RNA (ribonucleic acid) or combinations of DNA and RNA. Examples of polysaccharides include chitin and chitosan, which are major ingredients of outer shells in shellfishes, curdlans that are fermented polysaccharides produced by microorganisms, and schizophylan produced by Schizophyllum. Examples of the derivatives of polysaccharides include methylcellulose, hydroxypropylcellulose, hydroxypropylmethylcellulose and carboxymethylcellulose. Examples of the protein include collagen and myosin. Examples of the modified protein include gelatin. Examples of the polyamino acid include polyglutamic acid and polylysine. Furthermore, examples of the water-soluble synthesized polymer include one or two or more polymers selected from the group consisting of polyethylene glycol, polyethylene oxide, polyvinyl alcohol polyvinylmethyl alcohol, polyvinyl pyrrolidone, polyacrylic acid and polystyrene sulfonic acid. By controlling the molecular weight of these polymers, it is possible to optimize a prepared product to be suitable for its use.

In a weight ratio of the combination in the liquid crystalline gel, when the amount of a rod-like or semi-flexible water-soluble polymer which is the major ingredient is 100% by weight, the amount of a rod-like polymer which is a minor ingredient is 1 to 400% by weight and preferably 1 to 100% by weight, and the amount of a semi-flexible polymer which is the minor ingredient is 1 to 150% by weight and preferably 1 to 100% by weight. Here, the amount of the rod-like polymer is limited to the range of 1 to 400% by weight because if the amount is less than a lower limit value, the effect obtained by combining two or more water-soluble polymers is reduced and if the amount exceeds an upper limit value, aggregations are formed between the water-soluble polymer which is the major ingredient in the liquid crystalline gel and the rod-like polymer combined with this water-soluble polymer and the aggregations are precipitated. The amount of the semi-flexible polymer is limited to the range of 1 to 400% by weight because if the amount is less than the lower limit value, the effect obtained by combining two or more water-soluble polymers is reduced and if the amount exceeds the upper limit value, the aggregations are formed between the water-soluble polymer which is the major ingredient in the liquid crystalline gel and the semi-flexible polymer combined with this water-soluble polymer and the aggregations are precipitated, or an orientation of the water-soluble polymer which is the major ingredient in the liquid crystalline gel is prevented.

A shape of the liquid crystalline gel is columnar, cylindrical, bar, fibrous, spherical, platy or film-like, and the form of the liquid crystalline gel has a three dimensional structure. When the liquid crystalline gel is formed into the columnar, cylindrical, rod-like or fibrous shape, observing in a cross section perpendicular to the longitudinal direction, the water-soluble polymer oriented radially from the center is the major ingredient. This liquid crystalline gel includes the gel having a concentric multilayered structure when observed in a cross section perpendicular to the longitudinal direction. When the liquid crystalline gel is formed into a spherical shape, the water-soluble polymer oriented radially from the center when the gel is observed in a diameter cross section is the major ingredient in the liquid crystalline gel. This liquid crystalline gel also includes the gel having the concentric multilayered structure when observed in a diameter cross section. Furthermore when the liquid crystal is formed into a platy or film-like shape, the water-soluble polymer oriented radially from the center when a plate surface or a film surface is observed is the major ingredient in the liquid crystalline gel. This liquid crystalline gel also includes the gel having the concentric multilayered structure when the plate surface or film surface is observed. Basically, the liquid crystalline gel composed mainly of these water-soluble polymers is obtained by dissolving the water-soluble polymer in water or the aqueous solution of the salt(s) to prepare the polymer solution and subsequently dialyzing this polymer solution in the aqueous solution containing the chemical crosslinking agent.

(a) First Process for Producing Liquid Crystalline Gel (Process for Producing Cylindrical or Columnar Liquid Crystalline Gel)

Representatively, gelatin having the molecular weight of 300,000 is used as the water-soluble polymer, water is used as the solvent to dissolve this, and the process will be described.

First, gelatin is dissolved in water to prepare a gelatin solution. In order to produce the liquid crystalline gel of the present invention, gelatin at 5 to 30% by weight, preferably 20 to 30% by weight based on the water is added to the water. When the amount of added gelatin is less than the lower limit value, no liquid crystalline gel is formed. When it exceeds the upper limit value, the viscosity increases and it becomes difficult to obtain the homogenous solution. Then, the resulting gelatin solution is heated to 40° C. to solate and filled in a dialysis tube composed of a semipermeable membrane. Before filling, a lower end of the tube is sealed. The semipermeable membrane is not particularly limited, but it is necessary to choose a material, which is not dissolved with the chemical crosslinking agent. Acetate cellulose and polymethyl methacrylate are exemplified, and a cellulose-based dialysis tube is preferable. Here, a speed of the gelation and a crystallinity and a layer structure of the resulting liquid crystalline gel are changed by a membrane thickness and the diameter of the dialysis tube. An outer diameter of the cylindrical liquid crystalline gel obtained finally depends on the diameter of the tube. The diameter and the length of the tube are determined depending on the use of the liquid crystalline gel. For example, the diameter is selected from the range of 6 mm to 10 cm, and the cylindrical or columnar liquid crystalline gel having the outer diameter of 6 mm to 10 cm and an inner diameter of 0 mm to 4 cm (thickness: 1.8 mm to 3 cm) is obtained from this tube. The gelatin solution is filled and sealed in the tube by filling the gelatin solution in the tube and sealing an upper end of the tube.

Then, the gelatin solution filled and sealed in the tube is stored in a cold place (4° C.) to gelate physically for an appropriate time period. Subsequently, the gelatin solution filled and sealed in the tube is immersed in the aqueous solution containing the chemical crosslinking agent (glutaraldehyde, ethylene glycol diglycidyl ether). After the immersion, the chemical crosslinking agent is diffused in the tube to chemically gelate the gelatin solution, and further in this process, the liquid crystallization occurs. As the chemical crosslinking agent at that time, formaldehyde, glutaraldehyde or ethylene glycol diglycidyl ether is suitable in that gelatin is chemically crosslinked. The concentration of the chemical crosslinking agent in the aqueous solution containing the chemical crosslinking agent is preferably 0.1% by weight or higher and the concentration equal to or lower than a saturated concentration, and more preferably within the range of 20 to 40% by weight. When the concentration of the chemical crosslinking agent in the aqueous solution containing the chemical crosslinking agent is lower than the lower limit value, the gel is not formed. When it exceeds the upper limit value, the strain of the liquid crystalline gel occurs due to remarkable shrinkage of the gel. A temperature of this aqueous solution is preferably 0° C. or above and the temperature equal to or lower than a sol-gel transition temperature of gelatin, and more preferably within the range of 0 to 20° C. When the temperature of the above aqueous solution is lower than the lower limit value, a diffusion speed of the chemical crosslinking agent is slow and the solution is likely to be solidified. When it exceeds the upper limit value, the liquid crystalline gelation does not occur, or the function is reduced, e.g., an orientation degree is reduced. By the above dialysis, a columnar body having the diameter corresponding to the diameter of this tube is formed in the tube. Generally when a dialysis time period is shortened, the center of the columnar body is the sol and the circumference thereof is the liquid crystalline gel. Conversely when the dialysis time period is prolonged, or when the gelatin concentration is increased or the concentration of the chemical crosslinking agent in the aqueous solution containing the chemical crosslinking agent is increased, the solid-core columnar liquid crystalline gel is formed. That is, when the center of the columnar body is the sol, a sol part is eliminated by taking out this columnar body from the tube and then rinsing it with water, and the cylindrical liquid crystalline gel is obtained. When the entire columnar body is the gel, by taking out this columnar body from the tube and then rinsing it with water, the solid-core columnar liquid crystalline gel is formed. For example, under the condition where the diameter of the dialysis tube is 12 mm, the gelatin concentration is 30% by weight and the concentration of glutaraldehyde is 25% by weight, when the dialysis time period is 0 to 240 minutes, the cylindrical liquid crystalline gel is formed, and when the dialysis time period is 240 minutes or longer, the columnar liquid crystalline gel is formed.

Figure 2:
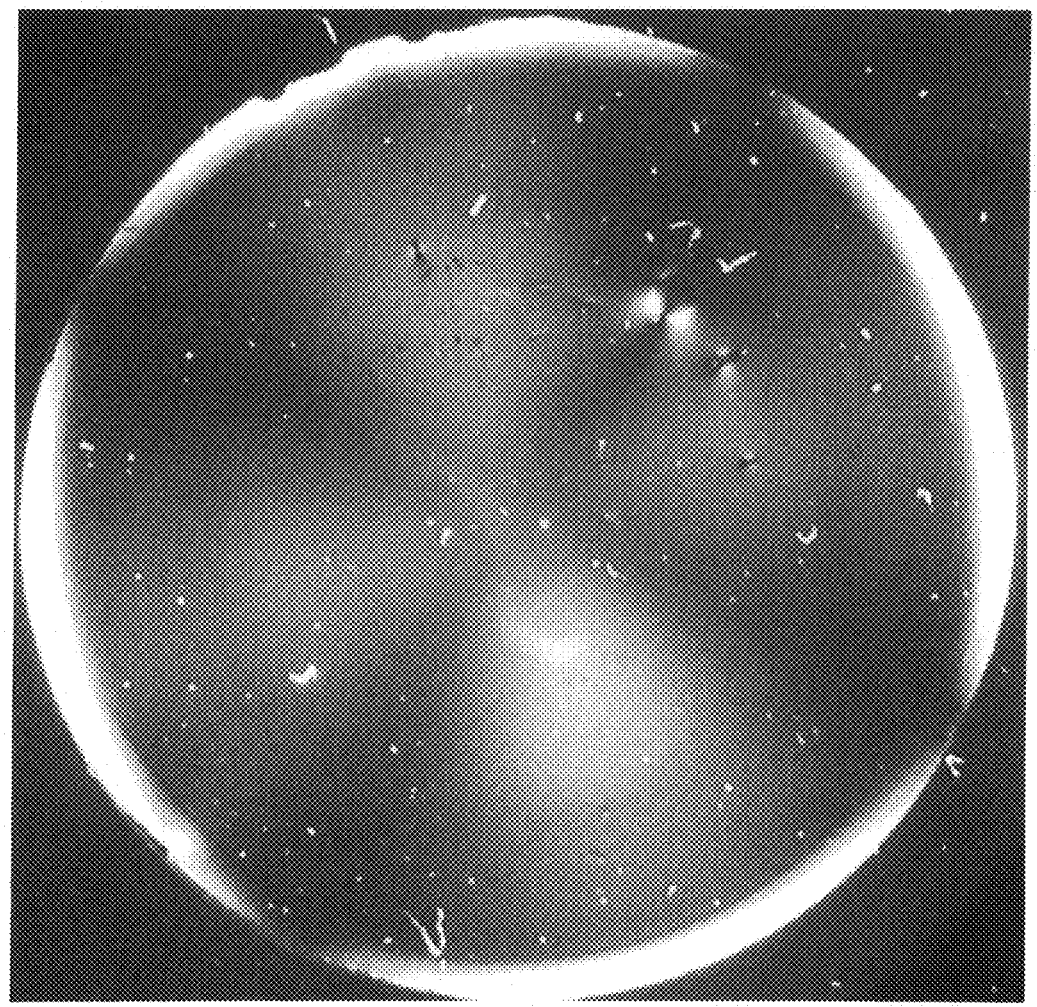
FIG. 2 is a view obtained by observing the liquid crystal in FIG. 1 under crossed nicols.

When the cylindrical liquid crystalline gel is cut perpendicularly to the longitudinal direction and a cut surface is observed under the natural light, the polymer is radially oriented in concentric circle from the center like a cross section of a pineapple fruit as shown in a schematic view in FIG. 1. Meanwhile, when it observed under crossed nicols, cross lines appear as shown in FIG. 2, proving that this gel has the liquid crystal structure. These cross lines indicate that gelatin molecules or aggregates thereof are regularly oriented from the center.

In order to make the concentric multilayered structure when the cylindrical or columnar liquid crystalline gel is observed at its cross section perpendicular to the longitudinal direction, the following process is performed. First, the gelatin solution is filled in the tube to form the columnar body. Then, this columnar body is placed at a predetermined temperature (e.g., 40° C.) in the range of 10 to 50° C., e.g., in a first incubator, and immersed in the aqueous solution containing the chemical crosslinking agent for 10 to 20 minutes to dialyze the gelatin solution in the above tube. Specifically, the aqueous solution containing the chemical crosslinking agent is retained in a container, the columnar body is immersed in this aqueous solution containing the chemical crosslinking agent, the whole container is placed in the first incubator and the gelatin solution in the columnar body is dialyzed. Subsequently, the whole container including the above columnar body together with the aqueous solution containing the chemical crosslinking agent is transferred from the first incubator into a second incubator in which the temperature is kept at 5 to 40° C., preferably 10 to 40° C. lower than in the first incubator. The gelatin solution in the columnar body is dialyzed in this second incubator for 10 to 20 minutes. Further, the whole container including the above columnar body together with the aqueous solution containing the chemical crosslinking agent is transferred again to the first incubator. The gelatin solution in the columnar body is dialyzed in the first incubator for 10 to 20 minutes. This way, by repeating the dialysis of the columnar body under the conditions at different temperature, it is possible to form the cylindrical or columnar liquid crystalline gel having the concentric multilayered structure when a cross section perpendicular to the longitudinal direction is observed, in the tube. A thermal medium retained in the above first and second incubator may be a liquid or a gas, but the water is preferable. Here, the temperature of the thermal medium in the first incubator is limited within the range of 10 to 50° C. because when the temperature is lower than 10° C., it becomes difficult to set the temperature in the second incubator and when the temperature is higher than 50° C., the biopolymers such as proteins are denatured and the chemical crosslinking agent is excessively vaporized. The temperature of the thermal medium in the second incubator is 5 to 40° C. lower than the temperature of the thermal medium in the first incubator because when the temperature is lower than 5° C., no clear multilayer structure is obtained and when the temperature is higher than 40° C., the solution is likely to be frozen. By repeating a step of immersing the tube in the aqueous solution containing the chemical crosslinking agent at a predetermined temperature, a step of taking out the tube from this aqueous solution and leaving it stand in air for 5 to 30 minutes and immersing this tube in the above aqueous solution again, the cylindrical gel having the concentric multilayered structure when a cross section perpendicular to the longitudinal direction of the tube is observed may be formed in the tube.

(b) Second Process for Producing Liquid Crystalline Gel (Process for Producing Spherical Liquid Crystalline Gel)

As is the case with the first process, representatively, gelatin is used as the water-soluble polymer, the water is used as the solvent in which this is dissolved, and the process will be described.

First, gelatin is dissolved in the water to prepare the gelatin solution. Gelatin is added to the water in order to produce the liquid crystalline gel of the present invention. This process is different from the first process in that the concentration of gelatin in the gelatin solution when the gelatin solution is prepared requires the viscosity to an extent that the spherical shape can be kept by surface tension during the formation of the semipermeable membrane in order to self-form the semipermeable membrane.

In the second process, a syringe, a nozzle, a spray or a micropipette is used in place of the dialysis tube composed of the semipermeable membrane. The outer diameter of the spherical liquid crystalline gel finally obtained depends on a nozzle size of an outlet in the syringe. The nozzle size of the outlet in the syringe is determined depending on the use of the liquid crystalline gel, and selected from the range of 1 μm to 1 mm. The spherical liquid crystalline gel having the outer diameter of 100 μm to 4 mm is obtained from this syringe. After filling the gelatin solution in the syringe, the syringe with pointing the outlet down is secured at a predetermined position 1 to 15 cm upper than a liquid surface of the aqueous solution containing the chemical crosslinking agent.

Then, the gelatin solution filled in the syringe is dropped into the aqueous solution containing the chemical crosslinking agent by applying the pressure inside the syringe. At that time, it is preferable that the temperature of the aqueous solution containing the chemical crosslinking agent is kept at low temperature of 4 to 10° C. The semipermeable membrane is formed on all circumferences of a droplet while suspending the gelatin solution droplets in the aqueous solution. By keeping this state, the gelatin solution, which composes the droplet, is dialyzed and the spherical liquid crystalline gel is formed. The liquid crystalline gel having the outer diameter depending on the nozzle size of the outlet in the syringe is formed.

When this spherical liquid crystalline gel is cut in a diameter direction to make hemispheres and the cut surface is observed, although not shown in the figure, the spherical liquid crystalline gel has an outer shell and is in concentric circle, and the polymer such as gelatin is radially oriented from the center. Inside this liquid crystalline gel, the center portion is not gelated and the sol portion is present in some cases. The mechanism to form this structure is the same as in the cylindrical liquid crystalline gel.

In order to make the concentric multilayered structure when the spherical liquid crystalline gel is observed in its diameter cross section, the following process is performed. First, the spherical gel is prepared by dropping and immersing for 1 to 5 minutes the gelatin solution in the aqueous solution containing the chemical crosslinking agent in the first incubator kept at a predetermined temperature (e.g., 40° C.) in the range of 10 to 50° C. Specifically, the spherical gel is prepared by dropping and immersing the gelatin solution in the aqueous solution containing the chemical crosslinking agent in the container, in the state where the container in which the aqueous solution containing the chemical crosslinking agent is retained is placed in the first incubator. Then, the whole container including the spherical gel together with the aqueous solution containing the chemical crosslinking agent is transferred from the first incubator into the second incubator in which the temperature is kept at 5 to 40° C., preferably 10 to 20° C. (e.g., 40° C.) lower than in the first incubator, and the gelatin solution in the spherical gel is dialyzed for 1 to 5 minutes. Further, the whole container including the spherical gel together with the aqueous solution containing the chemical crosslinking agent is transferred again into the first incubator, and the gelatin solution in the spherical gel is dialyzed for 1 to 5 minutes in the first incubator. This way, by repeating the dialysis of the spherical gel under the conditions at different temperature, it is possible to form the spherical liquid crystalline gel having the concentric multilayered structure when a diameter cross section is observed. When the drug is contained in this gel or in a sol layer inside the gel and the gel is put in the body, it is possible to gradually release the drug in the body. That is, when the drug contained in an outmost layer of the gel or the sol layer inside the gel is released, the drug contained in a second outmost layer migrates in the outmost layer and is released from the outmost layer in the body. The drug put in the body is gradually released by migrating the drug from an inner layer to the outmost layer. By repeating the step of immersing the spherical liquid crystalline gel in the aqueous solution containing the chemical crosslinking agent at a predetermined temperature, the step of taking out the spherical liquid crystalline gel from this aqueous solution and leaving it stand in air for 5 to 30 minutes and the step of immersing this spherical liquid crystalline gel in the above aqueous solution again, the spherical liquid crystalline gel having the concentric multilayered structure when the spherical liquid crystalline gel is observed in its diameter cross section may be formed.

(c) Third Process for Producing Liquid Crystalline Gel (Process for Producing Process for Producing Rod-Like or Fibrous Liquid Crystalline Gel)

First, gelatin having the molecular weight of 300,000 is dissolved in the water to prepare the gelatin solution where the gelatin concentration is 20% by weight. This gelatin solution is warmed at 40° C. to solate, subsequently the sol is aspirated by a capillary, and is gelated thoroughly in a cool place. Subsequently, the gelatin gel is pushed out from the capillary in the aqueous solution containing glutaraldehyde at 25% by weight. This forms the gel having the rod-like or fibrous crystal structure, which is in concentric circle and where the polymer is radially oriented from the center when a cross section perpendicular to the longitudinal direction.

In order to make the concentric multilayered structure in the rod-like or fibrous liquid crystalline gel when a cross section perpendicular to the longitudinal direction is observed, the following process is performed. First, the rod-like or fibrous liquid crystalline gel is prepared by for 0.1 to 5 minutes immersing the rod-like or fibrous droplet obtained by pushing out the gelatin solution using the nozzle, the syringe needle or the micropipette in the aqueous solution containing the chemical crosslinking agent, in the first incubator kept at a predetermined temperature (e.g., 10° C.) in the range of 0 to 30° C. Specifically, the rod-like or fibrous liquid crystalline gel is prepared by pushing out the gelatin gel in the aqueous solution containing the chemical crosslinking agent in the container using the nozzle, in the state where the container in which the aqueous solution containing the chemical crosslinking agent is retained is placed in the first incubator. Then, the whole container including the rod-like or fibrous gel together with the aqueous solution containing the chemical crosslinking agent is transferred from the first incubator into the second incubator in which the temperature is kept at 5 to 40° C., preferably 10 to 20° C. (e.g., 20° C.) lower than in the first incubator, and the gelatin solution in the rod-like or fibrous gel is dialyzed for 1 to 5 minutes. Further, the whole container including this rod-like or fibrous gel together with the aqueous solution containing the chemical crosslinking agent is transferred again into the first incubator, and the gelatin solution in the rod-like or fibrous gel is dialyzed for 1 to 5 minutes in the first incubator. This way, by repeating the dialysis of the rod-like or fibrous gel under the conditions at different temperature, it is possible to form the rod-like or fibrous liquid crystalline gel having the concentric multilayered structure when a cross section perpendicular to the longitudinal direction is observed. By repeating the step of immersing the rod-like or fibrous liquid crystalline gel in the aqueous solution containing the chemical crosslinking agent at a predetermined temperature, the step of taking out the rod-like or fibrous liquid crystalline gel from this aqueous solution and leaving it stand in air for 5 to 30 minutes and the step of immersing this rod-like or fibrous liquid crystalline gel in the above aqueous solution again, the rod-like or fibrous liquid crystalline gel having the concentric multilayered structure when a cross section perpendicular to the longitudinal direction is observed may be formed.

(d) Fourth Process for Producing Liquid Crystalline Gel (Process for Producing Platy or Film-Like Liquid Crystalline Gel)

As is the case with the first process, the process in which the gelatin solution is made into the liquid crystalline gel in the aqueous solution containing the chemical crosslinking agent to process into a plate or a film will be described as a representative.

First the same gelatin solution and aqueous solution containing the chemical crosslinking agent as in the first process for producing the liquid crystalline gel are prepared. The gelatin solution is solated at 40° C., this gelatin solution is dropped on a first flat plate, and a second flat plate having almost the same size as the first plate is covered thereon to flatten the dropped gelatin solution. The first flat plate is not particularly limited as long as its surface is smooth and the formed platy or film-like liquid crystalline gel is easily peeled. As the first flat plate, glass substrates, plastic substrates and ceramic substrates are exemplified. The second flat plate is not particularly limited as long as the plate is smooth and the formed platy or film-like liquid crystalline gel is easily peeled in order to make the thickness of the gelatin solution (liquid film) to be flattened even. As the second flat plate, cover glasses, acrylic plates or PET (polyethylene terephthalate) are preferable. The size of the second flat plate is not particularly limited, and its example is selected from the range of the thickness of 0.12 to 17 mm and the diameter of 15 to 22 mm. The thickness of the flattened water-soluble polymer solution, i.e., the thickness of the liquid film is not particularly limited, and if exemplified, the thickness of 0.5 to 2 mm is preferable. Then, this flattened gelatin solution sandwiched with the first and second flat plates is placed in the cold place (4° C.) to gelate for an appropriate time period, and then immersed in the aqueous solution containing the chemical crosslinking agent. Even when the gel is immersed in this aqueous solution, the second flat plate is not peeled from the liquid film by an interaction with the gelatin solution. In this aqueous solution, the semipermeable membrane is formed in the part (side circumference of liquid film), which is not covered with the first and second flat plate in the flattened gelatin solution (liquid film). This semipermeable membrane is composed of the gelatin gel induced by the reaction of glutaraldehyde with gelatin. By keeping this state, the gelatin solution, which composes the liquid film, is dialyzed, and the platy or film-like liquid crystalline gel is formed inside the semipermeable membrane. The thickness of this platy or film-like liquid crystalline gel is proportional to a radius of the above liquid film and becomes the range of 0.5 to 2 mm, and the size is proportional to the size of the second flat plate and becomes a disc having the diameter of 15 to 22 mm. When the plate surface or the film surface is observed, although not shown in the figure, the gelatin molecules in the platy or film-like liquid crystalline gel are in concentric circle and are radially oriented from the center.

In order to make the concentric multilayered structure when the plate surface or the film surface is observed, the following process is performed. First, the gelatin solution sandwiched with the first and second flat plates is placed in the cold place (4° C.) to gelate. Then, the platy or film-like liquid crystalline gel is prepared by immersing this gelated liquid film in the aqueous solution containing the chemical crosslinking agent for 10 to 20 minutes to dialyze the gelatin solution in the liquid film, in the first incubator kept at a predetermined temperature (e.g., 40° C.) in the range of 10 to 50° C. Specifically, the platy or film-like liquid crystalline gel is prepared by immersing the gelated liquid film sandwiched with the first and second flat plates in the aqueous solution containing the chemical crosslinking agent in the container, in the state where the container in which the aqueous solution containing the chemical crosslinking agent is retained is placed in the first incubator. Then, the whole container including the platy or film-like gel together with the aqueous solution containing the chemical crosslinking agent is transferred from the first incubator into the second incubator in which the temperature is kept at 5 to 40° C., preferably 10 to 20° C. (e.g., 20° C.) lower than in the first incubator, and the gelatin solution in the platy or film-like gel is dialyzed for 1 to 5 minutes. Further, the whole container including the platy or film-like gel together with the aqueous solution containing the chemical crosslinking agent is transferred again into the first incubator, and the gelatin solution in the platy or film-like gel is dialyzed for 1 to 5 minutes in the first incubator. This way, by repeating the dialysis of the platy or film-like gel under the conditions at different temperature, it is possible to form the platy or film-like liquid crystalline gel having the concentric multilayered structure when the plate surface or the film surface is observed. By repeating the step of immersing the platy or film-like liquid crystalline gel in the aqueous solution containing the chemical crosslinking agent at a predetermined temperature, the step of taking out the platy or film-like liquid crystalline gel from this aqueous solution and leaving it stand in air for 5 to 30 minutes and the step of immersing this platy or film-like liquid crystalline gel in the above aqueous solution again, the platy or film-like liquid crystalline gel having the concentric multilayered structure when the plate surface or the film surface is observed may be formed.

EXAMPLES

Subsequently, Examples of the present invention will be described in detail together with Comparative Examples.

Example 1

A gelatin solution (polymer solution) was prepared by dissolving gelatin powder at 10 to 30% by weight derived from swine epidermis, which is one of water-soluble modified proteins, in ultrapure water. This gelatin solution was dispensed four types (diameter: 6 mm, 16 mm, 20 mm and 25 mm) of cellulose dialysis tubes, and then each tube is sealed, left stand in the cold place (4° C.) for 5 minutes, and subsequently immersed and dialyzed in an aqueous solution of 25% by weight of glutaraldehyde (aqueous solution containing the chemical crosslinking agent) at room temperature for 24 hours.

Comparative Example 1

Until a step of filling the gelatin solution in the dialysis tube, the manipulation was performed in the same way as in Example 1. The gelatin solution in the dialysis tube was dialyzed for 24 hours using the aqueous solution containing bivalent and trivalent metal ions in place of the aqueous solution containing the chemical crosslinking agent.

<Comparison Test 1 and Evaluation>

The tubes in Example 1 and Comparative Example 1 were compared. In Comparative Example 1, the liquid crystalline gel composed of gelatin was not formed, and when warmed at high temperature, the gelatin solution was easily solated. On the contrary, in Example 1, the gels having a large gel strength and four types different diameters were formed in the tube. At that time, any columnar gels shrank by about 10% compared with the diameter of the original dialysis tubes. When the gel in Example 1 was removed from the tube and observed, the gel has the solid-core in the center part. When these gels were cut in round slices in the direction perpendicular to the longitudinal direction and observed under crossed nicols using a polarizing lens, it was identified that the crystal structure where the molecules were oriented in the longitudinal direction was present. It was found that the gel tube composed of such a gelatin liquid crystalline gel could be made irrespective of the size of the dialysis tube.

Example 2

A gelatin solution was prepared by dissolving 10% by weight of gelatin powder derived from swine epidermis, which was one of the water-soluble proteins, in water. A glass substrate was prepared, the above gelatin solution was dropped on this glass substrate, and the droplet was covered with a disc cover glass having a thickness of 0.12 to 0.17 mm and the diameter of 12 mm. This formed a liquid film having the thickness of about 1 mm between the glass substrate and the cover glass. Meanwhile, as a solidification liquid containing the chemical crosslinking agent, the aqueous solution containing 10% ethylene glycol diglycidyl ether was prepared. The droplet coveted with the cover glass on the glass substrate was immersed in this ethylene glycol diglycidyl ether, and dialyzed at room temperature for 24 hours.

Example 3

The dialysis was performed in the same way as in Example 2, except that the aqueous solution containing 30% by weight of ethylene glycol diglycidyl ether was used as the solidification liquid containing the chemical crosslinking agent.

Example 4

The dialysis was performed in the same way as in Example 2, except that the aqueous solution containing 40% by weight of ethylene glycol diglycidyl ether was used as the solidification liquid containing the chemical crosslinking agent.

Example 5

The dialysis was performed in the same way as in Example 2, except that the aqueous solution containing 50% by weight of ethylene glycol diglycidyl ether was used as the solidification liquid containing the chemical crosslinking agent.

Example 6

The dialysis was performed in the same way as in Example 2, except that the gelatin concentration was 20% by weight.

Example 7

The dialysis was performed in the same way as in Example 2, except that the gelatin concentration was 20% by weight and the aqueous solution containing 30% by weight of ethylene glycol diglycidyl ether was used as the solidification liquid containing the chemical crosslinking agent.

Example 8

The dialysis was performed in the same way as in Example 2, except that the gelatin concentration was 20% by weight and the aqueous solution containing 40% by weight of ethylene glycol diglycidyl ether was used as the solidification liquid containing the chemical crosslinking agent.

Example 9

The dialysis was performed in the same way as in Example 2, except that the gelatin concentration was 20% by weight and the aqueous solution containing 50% by weight of ethylene glycol diglycidyl ether was used as the solidification liquid containing the chemical crosslinking agent.

Example 10

The dialysis was performed in the same way as in Example 2, except that the gelatin concentration was 30% by weight Example 11

The dialysis was performed in the same way as in Example 2, except that the gelatin concentration was 30% by weight and the aqueous solution containing 30% by weight of ethylene glycol diglycidyl ether was used as the solidification liquid containing the chemical crosslinking agent.

Example 12

The dialysis was performed in the same way as in Example 2, except that the gelatin concentration was 30% by weight and the aqueous solution containing 40% by weight of ethylene glycol diglycidyl ether was used as the solidification liquid containing the chemical crosslinking agent.

Example 13

The dialysis was performed in the same way as in Example 2, except that the gelatin concentration was 30% by weight and the aqueous solution containing 50% by weight of ethylene glycol diglycidyl ether was used as the solidification liquid containing the chemical crosslinking agent.

Comparative Examples 2 to 5

The dialysis was performed in the same way as in Examples 2 to 5, except that the gelatin concentration was 0.1% by weight <Comparison Test 2 and Evaluation>

After dialyzing in Examples 2 to 13 and Comparative Examples 2 to 5, the state of the liquid film between the glass substrate and the cover glass was observed. The results are shown in Table 1.

As is evident from Table 1, in Comparative Examples 2 to 13, the liquid film between the glass substrate and the cover glass was not gelated and remained to be the sol. In Comparative Examples 14 to 17, the gelatin solution could not keep the liquid film shape, was dissolved and the liquid crystalline gel was not formed. On the contrary, in Examples 2 to 13, the film was formed in the side of the liquid film between the glass substrate and the cover glass by the reaction of gelatin with ethylene glycol diglycidyl ether. This film served as the semipermeable membrane, and subsequently, a water-insoluble film was formed between the glass substrate and the cover glass by diffusion of ethylene glycol diglycidyl ether through the semipermeable membrane. By removing the cover glass, a disc film having the thickness of 1 mm and the diameter of 12 mm was obtained on the glass substrate. All of the films in Examples 2 to 13 were observed under the crossed nicols using a polarizing plate, and it was confirmed that all of the films have the crystal structure.

TABLE 1

| | Thickness of liquid film | Gelatin concentration (% by weight) | Concentration of ethylene glycol diglycidyl ether (% by weight) | Presence or absence of liquid crystalline gel formation |
|---|---|---|---|---|
| Example 2 | About 1 mm | 10 | 10 | Presence |
| Example 3 | About 1 mm | 10 | 30 | Presence |
| Example 4 | About 1 mm | 10 | 40 | Presence |
| Example 5 | About 1 mm | 10 | 50 | Presence |
| Example 6 | About 1 mm | 20 | 10 | Presence |
| Example 7 | About 1 mm | 20 | 30 | Presence |
| Example 8 | About 1 mm | 20 | 40 | Presence |
| Example 9 | About 1 mm | 20 | 50 | Presence |
| Example 10 | About 1 mm | 30 | 10 | Presence |
| Example 11 | About 1 mm | 30 | 30 | Presence |
| Example 12 | About 1 mm | 30 | 40 | Presence |
| Example 13 | About 1 mm | 30 | 50 | Presence |
| Comparative Example 2 | About 1 mm | 0.1 | 10 | Absence |
| Comparative Example 3 | About 1 mm | 0.1 | 30 | Absence |
| Comparative Example 4 | About 1 mm | 0.1 | 40 | Absence |
| Comparative Example 5 | About 1 mm | 0.1 | 50 | Absence |

Example 14

A myosin solution was prepared by dissolving myosin at 30 mg/mL, which was the water-soluble protein in the water containing 10 mM (millimolar) sodium phosphate and 0.6 M potassium chloride salt. This myosin solution was sandwiched between two cover glasses having the thickness of 0.12 to 0.17 mm and the diameter of 18 mm to form a liquid film of the myosin solution. This was immersed in 20 mL of the solidification liquid (aqueous solution) containing 25% by weight of glutaraldehyde (chemical crosslinking agent), and dialyzed at room temperature for 24 hours.

Comparative Example 6

The dialysis was performed in the same way as in Example 14, except that the concentration of the potassium chloride salt was 0.12 M.

<Comparison Test 3 and Evaluation>

After dialyzing in Example 14 and Comparative Example 6, the state of the liquid film between the two cover glasses was observed. The results are shown in Table 2.

TABLE 2

| | Concentration of sodium phosphate (mg/ml) | Concentration of potassium chloride (M) | Presence or absence of liquid crystalline gel formation |
|---|---|---|---|
| Example 14 | 10 | 0.6 | Presence |
| Comparative Example 6 | 10 | 0.12 | Absence |

As was evident from Table 2, the liquid crystalline gel was formed in Example 14 whereas no liquid crystalline gel was formed in Comparative Example 6.

<Comparison Test 4 and Evaluation>

Figure 3:
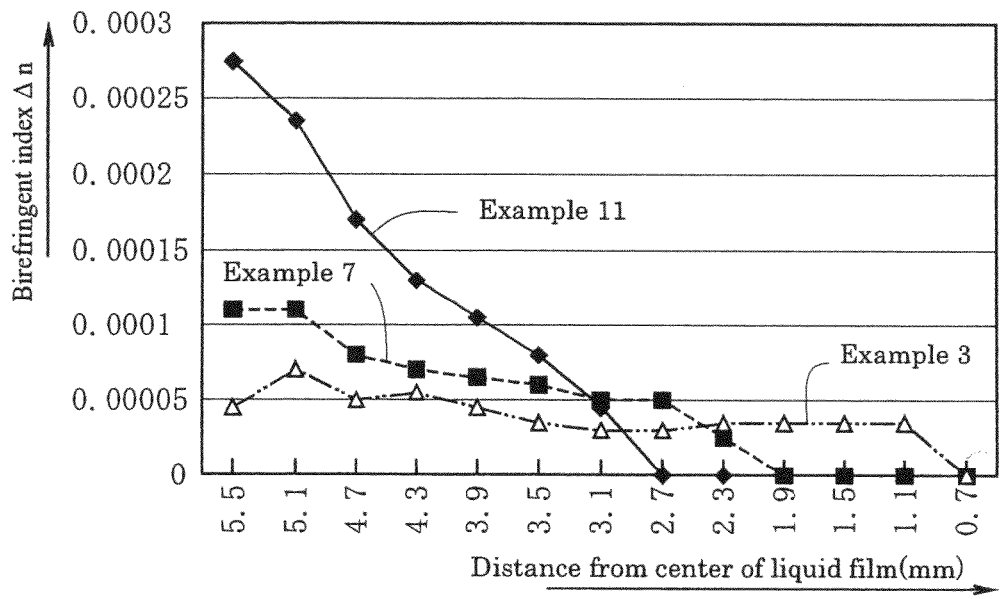
FIG. 3 is a graph showing changes of a birefringent index Dn by distance from the center of a liquid film, which is one of optical properties in the liquid crystalline gels in Examples 3, 7 and 11.
Figure 4:
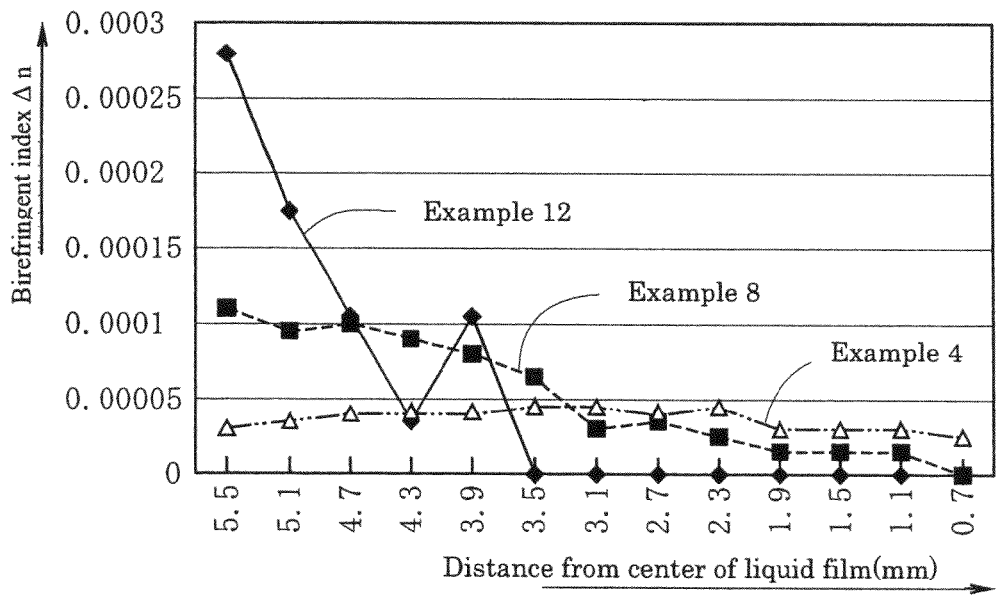
FIG. 4 is a graph showing changes of the birefringent index Dn by distance from the center of the liquid film, which is one of optical properties in the liquid crystalline gels in Examples 4, 8 and 12.
Figure 5:
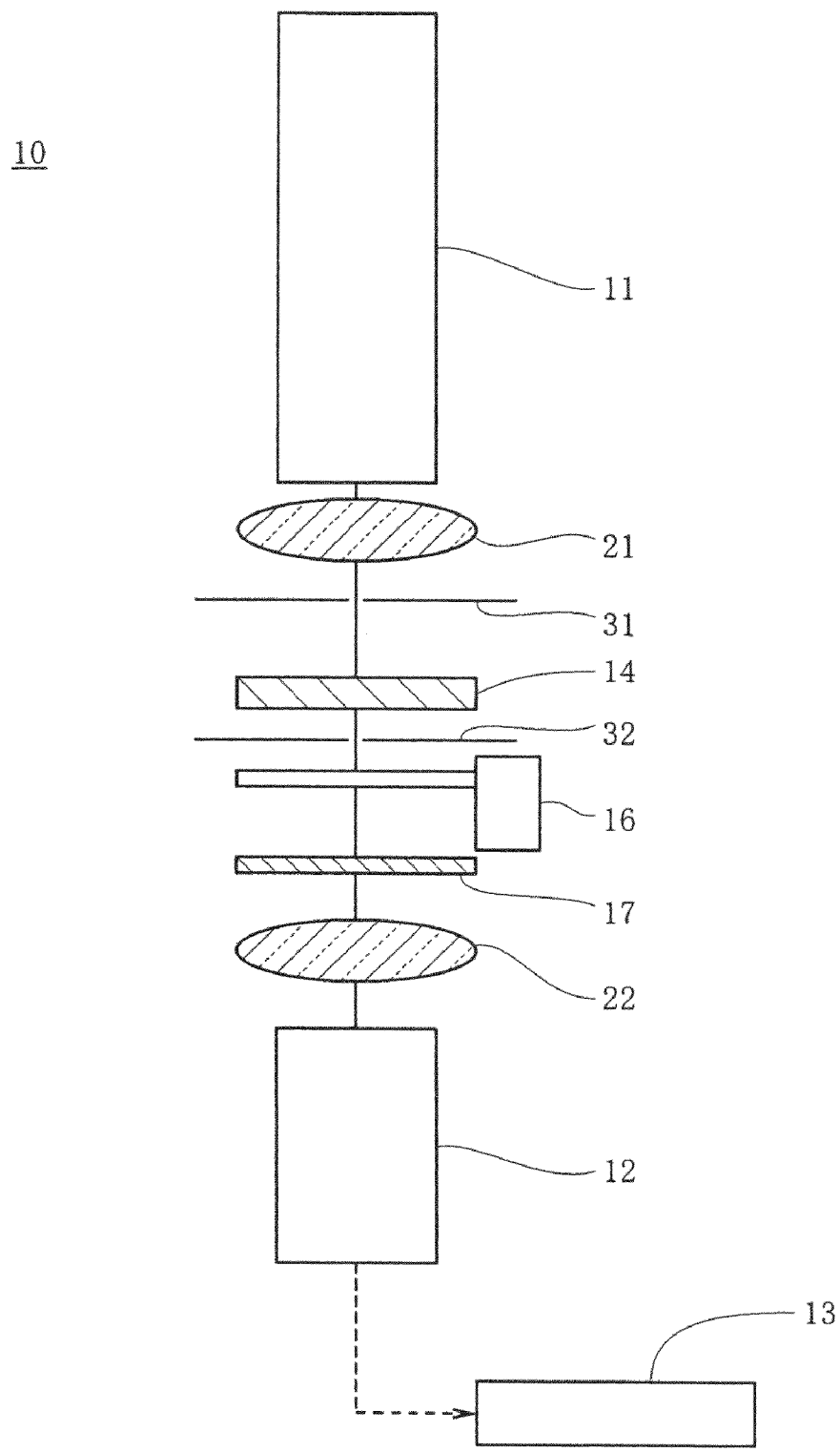
FIG. 5 is a constitution view of a birefringence measurement apparatus for measuring the birefringent index $\Delta n$ in the liquid crystalline gel.

Changes of a birefringent index Δn by a distance from the center of the liquid film, which was one of the optical properties, in the liquid crystal obtained from the liquid crystalline gel in Examples 3, 4, 7, 8, 11 and 12 were measured using a birefringence measurement apparatus 10 shown in FIG. 5. The results are shown in FIGS. 3 and 4. The above birefringence measurement apparatus 10 comprises a laser light emission unit 11 which emits an He—Ne laser light, a photo diode 12 which receives this laser and a photo counter 13 which counts the laser received by the photo diode 12 as shown in FIG. 5. Between the laser light emission unit 11 and the photo diode 12, a first lens 21, a first pinhole plate 31, a sample 14 of the liquid crystalline gel, a second pinhole plate 32, Berek compensator 16, a polarizing plate 17 and a second lens 22 are tandemly arranged in this order from the laser light emission unit 11 toward the photo diode 12.

From FIGS. 3 and 4, it was found that the gel in the above Example certainly had an oriented structure. It was also found that the optical physical property could be optimized for the objective use by controlling the concentrations of gelatin and the chemical crosslinking agent. From the above, it becomes possible to make the gel having the oriented structure and a controlled orientation degree by a simple technique which is a self-assembly phenomenon without using a microfabrication technology. By actively using the gel having this controlled orientation degree gradient, a display instrument having a different advantage from a display instrument by conventional materials with no gradient, i.e., the display instrument using the material having the controlled orientation degree gradient is likely to be developed.

Example 15

First, the aqueous solution of 10% by weight of DNA was prepared by dissolving DNA derived from salmon testis in the aqueous solution of 20 mM sodium tetraborate, and the aqueous solution of 10% by weight of gelatin was prepared by dissolving gelatin derived from swine epidermis in the aqueous solution of 20 mM sodium tetraborate. The above DNA aqueous solution and gelatin aqueous solution were mixed in equal amounts at 40° C. to prepare a mixed aqueous solution containing 5% by weight of DNA and 5% by weight of gelatin. Then, this mixed aqueous solution was completely solated at 40° C., this was sandwiched with two circular cover glasses having the diameter of 12 mm, and then left stand in a refrigerator at 4° C. for one hour to sufficiently gelate physically. A thin film of the gel was formed between these cover glasses. The thin film of the gel was made into the liquid crystalline gel with the chemical crosslinking agent by immersing this thin film of the gel in the aqueous solution of 25% by weight of glutaraldehyde and leaving stand overnight. This liquid crystalline gelation was performed in the incubator at 10° C. The above thin film of the liquid crystalline gel was rinsed with the ultrapure water 5 times to remove the extra crosslinking agent from the thin film of the liquid crystalline gel. This thin film of the liquid crystalline gel was made Example 15.

Example 16

The thin film of the liquid crystalline gel in Example 15 was warmed in the ultrapure water at 40° C. for half a day. This thin film of the liquid crystalline gel was made Example 16.

Comparative Example 7

The thin film of the gel was formed between two cover glasses in the same way as in Example 15. This thin film of the gel was made into the liquid crystalline gel with the metal cation by immersing the thin film of the gel in the aqueous solution of 200 mM aluminium chloride which was the metal salt and leaving stand overnight. This liquid crystalline gelation was performed in the incubator at 10° C. The above thin film of the liquid crystalline gel was rinsed with the ultrapure water 5 times to remove the extra metal salt from the thin film of the liquid crystalline gel. This thin film of the liquid crystalline gel was made Comparative Example 7.

Comparative Example 8

The thin film of the liquid crystalline gel in Comparative Example 7 was warmed in the ultrapure water at 40° C. for half a day. This thin film of the liquid crystalline gel was made Comparative Example 8.
<Comparison Test 5 and Evaluation>
The thin films of the liquid crystalline gel of the above Examples 15 and 16 and Comparative Examples 7 and 8 were removed from the cover glasses, put on the slide glass, and a stress and a strain were measured using a push-fit type elastic modulus measurement apparatus to make a stress-strain curve. These results are shown in FIGS. 6 to 9.

Figure 6:
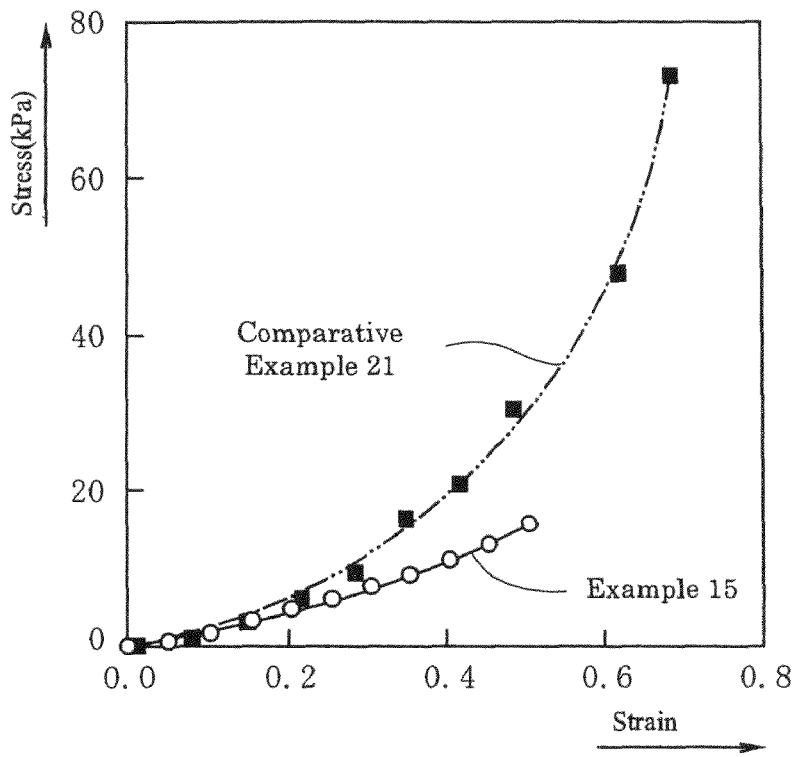
FIG. 6 is a view showing stress-strain curves of thin films of the liquid crystalline gels in Example 15 and Comparative Example 21 immediately after making the liquid crystalline gel.

As is evident from FIG. 6, it was found that the thin film of the liquid crystalline gel of Comparative Example 7 in which the liquid crystalline gel had been made with the metal cation had the higher elastic modules than the thin film of the liquid crystalline gel of Example 15 in which the liquid crystalline gel had been made with the chemical crosslinking agent. In the thin film of the liquid crystalline gel of Comparative Example 7, the strain was left when the probe was removed after the measurement, but the thin film of the liquid crystalline gel of Example 15 was back to the original volume when the probe was removed after the measurement. From this, it was found that the thin film of the liquid crystalline gel of Comparative Example 7 in which the liquid crystalline gel had been made with the metal cation had the nature that it was hard but the strain was easily left, and that the thin film of the liquid crystalline gel of Example 15 in which the liquid crystalline gel had been made with the chemical crosslinking agent had the nature that it was soft but the strain was hardly left.

Figure 7:
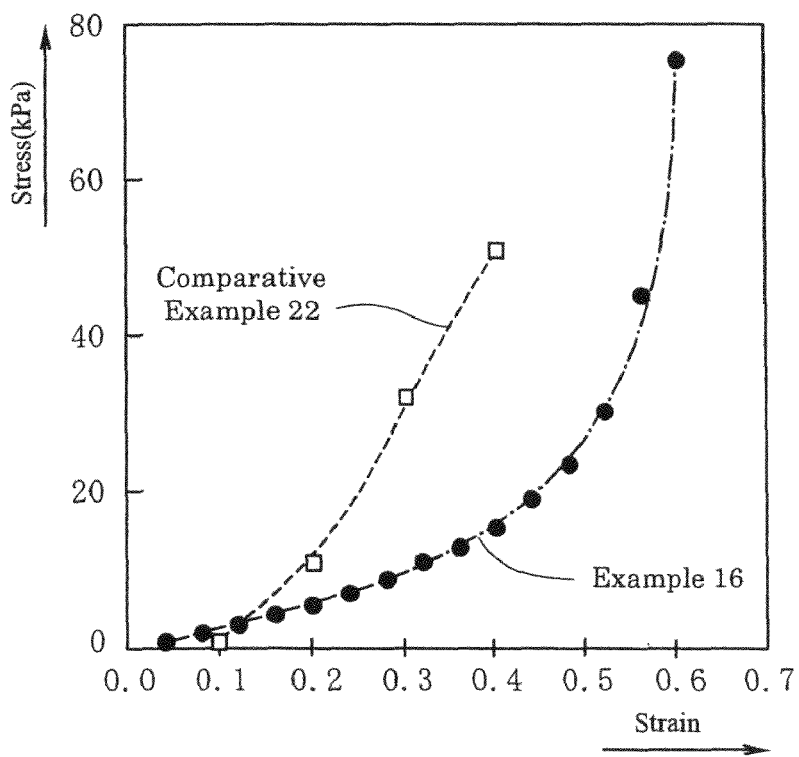
FIG. 7 is a view showing the stress-strain curves of the thin films of the liquid crystalline gels in Example 16 and Comparative Example 22 after warming the thin films of the liquid crystalline gels in Example 15 and Comparative Example 21 at 40° C. for half a day.
Figure 8:
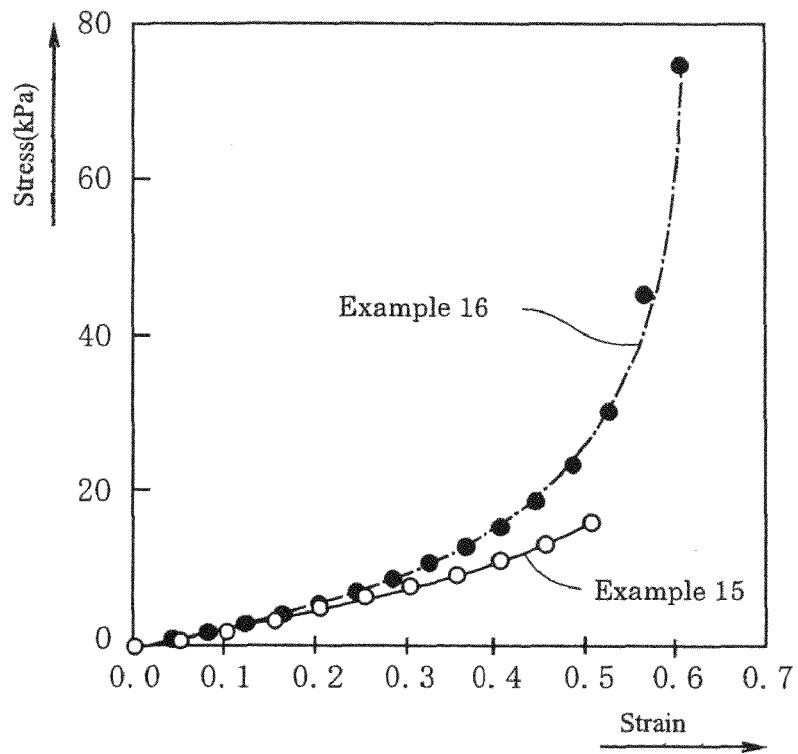
FIG. 8 is a view showing the stress-strain curves of the thin films of the liquid crystalline gels in Example 15 immediately after making the liquid crystalline gel and thin films of the liquid crystalline gels in Example 16 after warming the liquid crystalline gel.
Figure 9:
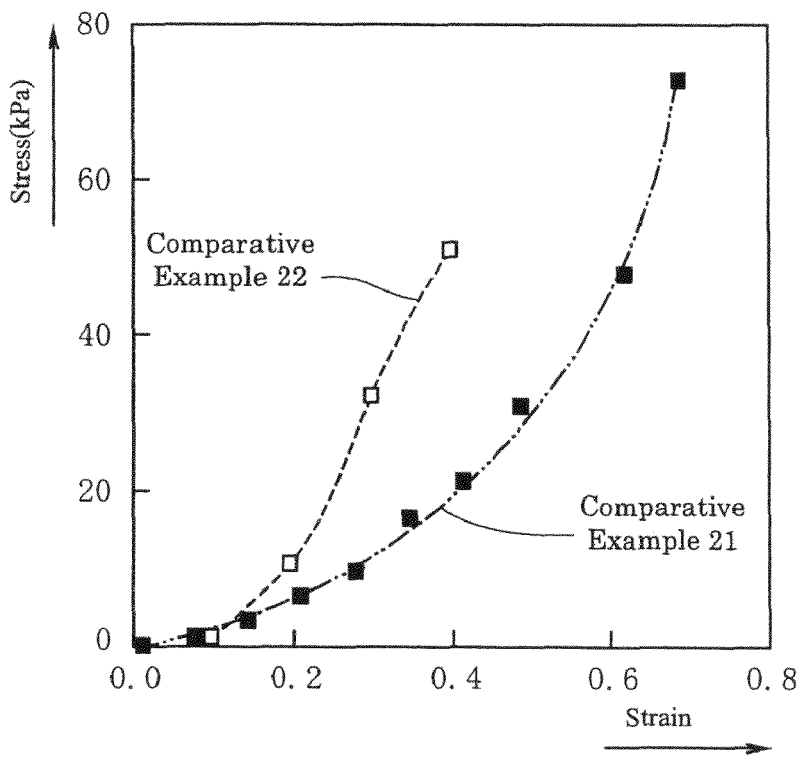
FIG. 9 is a view showing the stress-strain curves of the thin films of the liquid crystalline gels in Comparative Example 21 immediately after making the liquid crystalline gel and thin films of the liquid crystalline gels in Comparative Example 22 after warming the liquid crystalline gel.

Meanwhile, it was found that in the thin film of the liquid crystalline gel of Comparative Example 8 obtained by warming at 40° C. the thin film of the liquid crystalline gel gelated with the metal cation, its volume shrank by about 50%. It was also found that the thin film of the liquid crystalline gel of Comparative Example 8 became harder than the thin film of the liquid crystalline gel of Comparative Example 7 before being warmed (FIGS. 7 and 8), and only by giving a tiny strain, the strain was left. Therefore, it was found that the thin film of the liquid crystalline gel of Comparative Example 8 became harder by being warmed, and its deformation was easily left. Meanwhile, it was found that in the thin film of the liquid crystalline gel of Example 16 obtained by warming at 40° C. the thin film of the liquid crystalline gel gelated with the chemical crosslinking agent, its volume shrank by about 20%. In the thin film of the liquid crystalline gel of Example 16, when a small strain was given, the relationship between the stress and the strain was scarcely different from that in the thin film of the liquid crystalline gel of Example 15 before being warmed. However, when the large strain was given, the relationship between the stress and the strain was different from that in the thin film of the liquid crystalline gel of Example 15 before being warmed. A non-linearity appeared and the strain became small (FIGS. 7 and 8). Cracks occurred in the vicinity of the portion to which the strain was given almost simultaneously when the strain, which caused this non-linearity, was given. Therefore, it was found that in the warmed thin film of the liquid crystalline gel of Example 16, although the hardness of the thin film was scarcely changed, the strain was easily left.

From the above, it is conceivable that under the condition where the large deformation is given, it is not desirable to use thin film of the liquid crystalline gel of Comparative Example 7 gelated with the metal cation and it is suitable to use the thin film of the liquid crystalline gel of Example 15 gelated with the chemical crosslinking agent.

Example 17

First, the aqueous solution of 20% by weight of DNA was prepared by dissolving the DNA derived from salmon testis in the aqueous solution containing boric acid and sodium hydroxide (pH=11). The aqueous solution of 50% by weight of ethylene glycol diglycidyl ether (EGDE) was prepared by dissolving liquid EGDE in the aqueous solution containing boric acid and sodium hydroxide (pH=11). Subsequently, the DNA aqueous solution was filled in the dialysis tube having the diameter of about 8 mm, and this was dialyzed in the EGDE aqueous solution (chemical crosslinking agent aqueous solution) kept at 45° C. to make the liquid crystalline gel. This liquid crystalline gel was made Example 17.

Example 18

Figure 10:
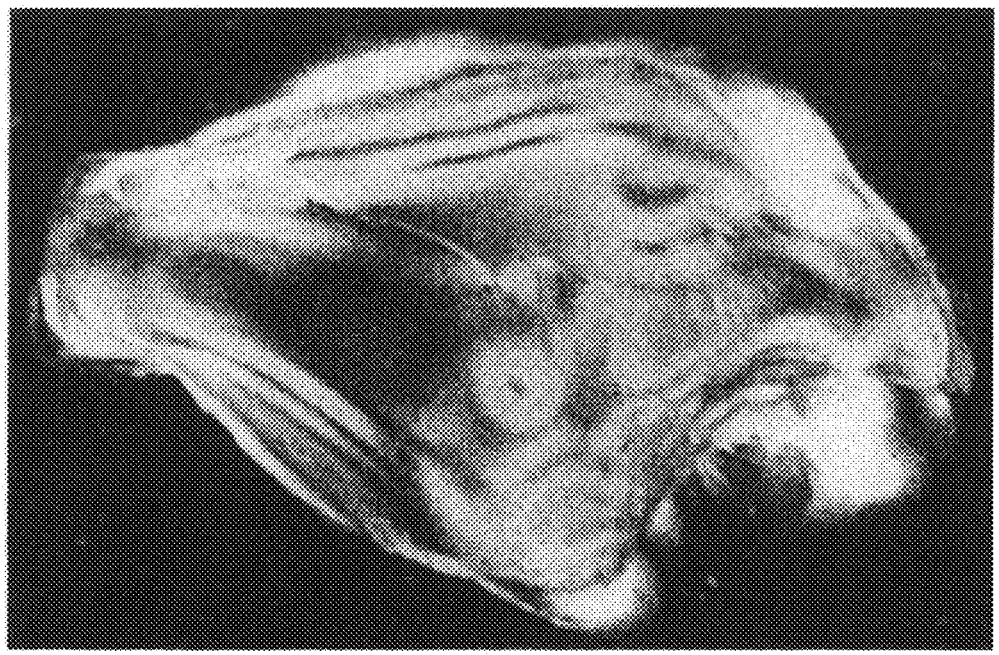
FIG. 10 is a view obtained by observing the liquid crystal gel in Example 17 under crossed nicols.

The liquid crystalline gel of Example 17 was immersed in the aqueous solution at 40° C. for 3 hours. This liquid crystalline gel was made Example 18.
<Comparison Test 6 and Evaluation>
The liquid crystalline gel of Example 17 was observed under the crossed nicols. The result is shown in FIG. 10. As is evident from FIG. 10, it was found that although the liquid crystalline gel of Example 17 was not so fair, the gel was crystallized. It was also found that the liquid crystalline gel of Example 18 obtained by immersing the liquid crystalline gel of Example 17 in the aqueous solution at 40° C. was not dissolved and was gelated, and left the crystal structure when observed under the crossed nicols. From them, it was found that the liquid crystal gel of DNA could be prepared by using EGDE, which was the chemical crosslinking agent. The liquid crystalline gel of Example 17 was not prepared under the optimal condition, and could not be made into the so fair liquid crystalline gel. However, it is predicted that the fair liquid crystalline gel can be prepared by optimizing the parameters such as a DNA concentration, an EGDE concentration and a reaction temperature.

Example 19

A gelatin solution containing gelatin was prepared by dissolving 10% by weight of gelatin powder derived from swine epidermis, which was one of the water-soluble proteins, in the water. The above gelatin solution was sandwiched with two disc cover glasses having the thickness of 0.12 to 0.17 mm and the diameter of 12 mm to prepare a thin film of the gelatin solution having the thickness of 1.5 mm. This thin film of the gelatin solution was physically gelated by placing it in the cold place for 10 minutes. Meanwhile, the aqueous solution containing 25% glutaraldehyde was prepared as the solidification liquid containing the chemical crosslinking agent, and the above thin film of the gelatin solution was immersed in this aqueous solution of glutaraldehyde and dialyzed with keeping the temperature at 10° C. for 24 hours to make the liquid crystalline gel. The gelatin liquid crystalline gel was prepared by the above process. This gelatin liquid crystalline gel was immersed in the ultrapure water at 40° C. to remove unreacted glutaraldehyde from the liquid crystalline gel. This gelatin liquid crystalline gel after washing was immersed in 99.8% methanol. This gelatin liquid crystalline gel was made Example 19.

Example 20

The gelatin liquid crystalline gel was prepared in the same way as in Example 19. The gelatin liquid crystalline gel from which unreacted glutaraldehyde had been removed was immersed in 99.5% ethanol. This gelatin liquid crystalline gel was made Example 20.

Example 21

The gelatin liquid crystalline gel was prepared in the same way as in Example 19. The gelatin liquid crystalline gel from which unreacted glutaraldehyde had been removed was immersed in 99.5% 2-propanol. This gelatin liquid crystalline gel was made Example 20.

Comparative Example 9

The thin film of the gelatin physical gel prepared in Example 19 was immersed in ethanol. This gelatin physical gel was made Comparative Example 9.

<Comparison Test 7 and Evaluation>

Figure 11:
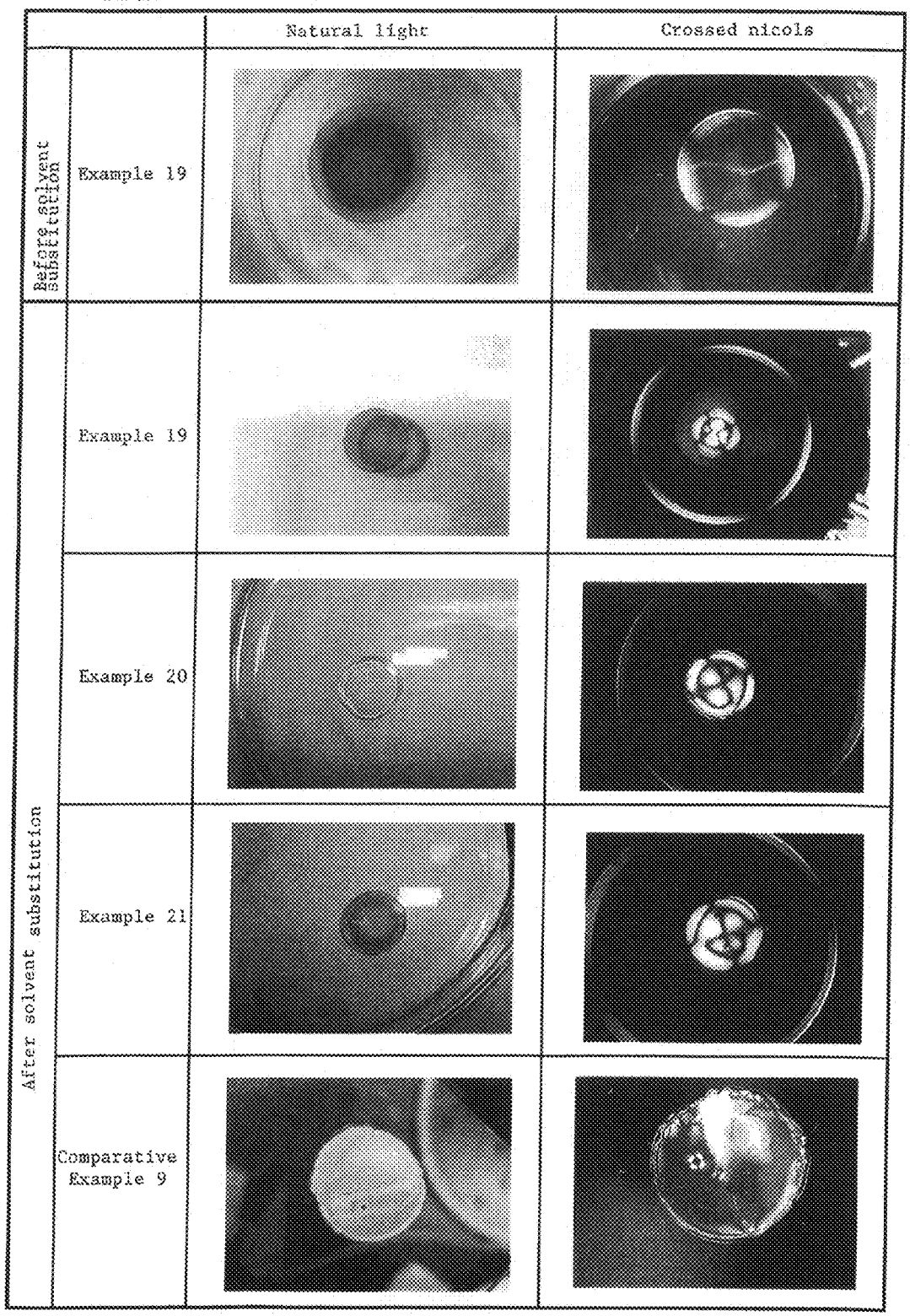
FIG. 11 is a view obtained by observing the liquid crystalline gels in Examples 19 to 21 and Comparative Example 9 before and after solvent replacement under natural light and crossed nicols.
Figure 12:
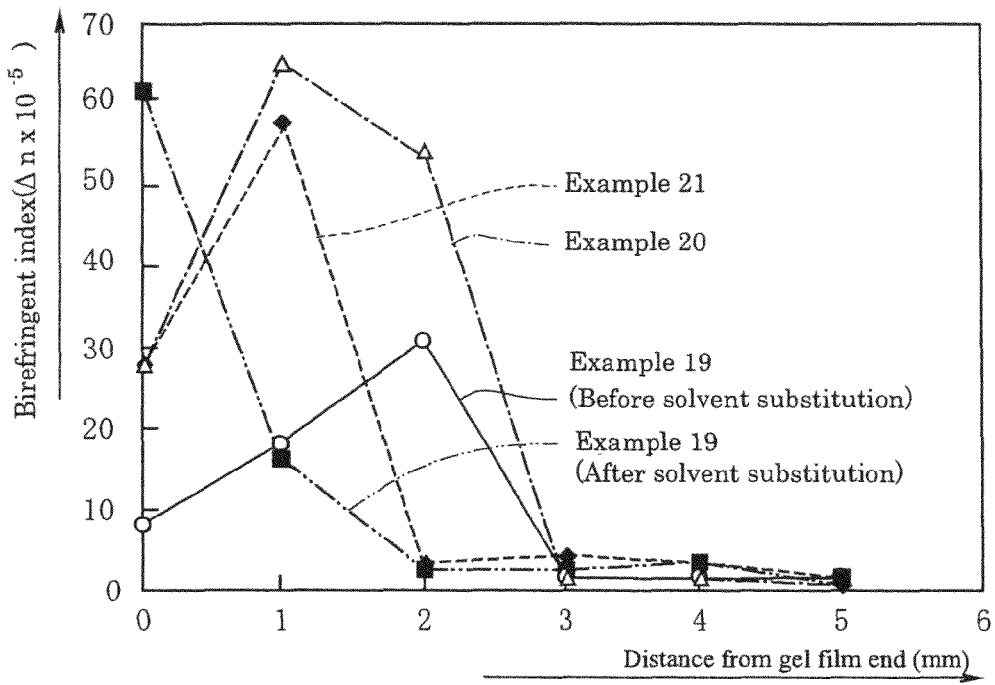
FIG. 12 is a graph showing the comparison of the birefringence $\Delta n$ in the liquid crystalline gels in Examples 19 to 21 before and after the solvent replacement.

Photos obtained by observing Examples 19 to 21 and Comparative Example 9 under the natural light and under the crossed nicols are shown in FIG. 11. As is evident from FIG. 11, it is clearly shown that when the solvent was substituted with alcohol, the gelatin liquid crystalline gels of Examples 19 to 20 have stronger optical anisotropy than before the solvent substitution. Meanwhile, in the liquid crystalline gel of Comparative Example 9, after the solvent substitution, the gelatin gel became clouded remarkably, and the regular optical anisotropy like in the gelatin liquid crystalline gels of Examples 19 to 20 could not be observed. The birefringent indices of the gelatin liquid crystalline gels of Examples 19 to 20 after the solvent substitution were compared with those before the solvent substitution. The results are shown in FIG. 12. As is evident from FIG. 12, it was found that the birefringent index $\Delta n$ of the gelatin liquid crystalline gels after the solvent substitution was enhanced compared with that before the solvent substitution.

<Comparison Test 8 and Evaluation>

Figure 13:
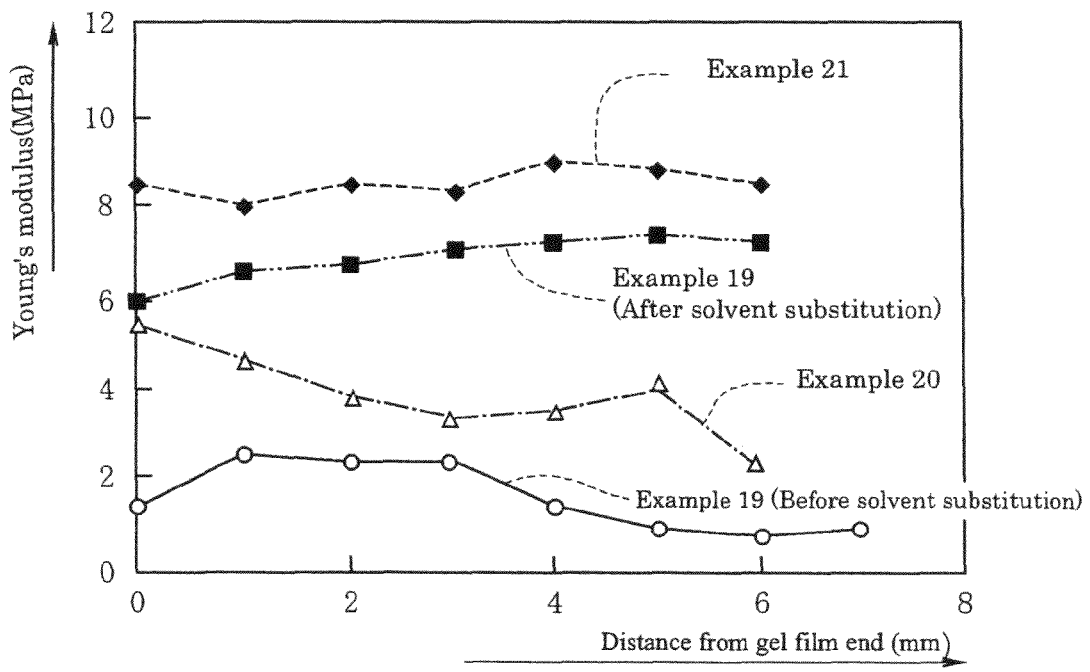
FIG. 13 is a graph showing the comparison of Young's modulus in the liquid crystalline gels in Examples 19 to 21 before and after the solvent replacement.

The Young's modulus of the gelatin liquid crystalline gels of Examples 19 to 20 after the solvent substitution was compared with those before the solvent substitution. The results are shown in FIG. 13. As is evident from FIG. 12, it was found that the value of the Young's modulus of the gelatin liquid crystalline gels after the solvent substitution was larger than that before the solvent substitution.

From the results of the above comparison test and evaluation, it was found that the birefringent index and the Young's modulus of the liquid crystalline gel obtained by using the chemical crosslinking agent could be controlled by substituting the swelling solvent with another solvent. Such a control of the physical property by a post-treatment of the liquid crystalline gel is the technology, which was impossible in the liquid crystalline gel obtained by using the metal ion.

Example 22

A gelatin solution containing gelatin was prepared by dissolving 20% by weight of gelatin powder derived from swine epidermis, which was one of the water-soluble proteins, in the water. The above gelatin solution was sandwiched with two disc cover glasses having the thickness of 0.12 to 0.17 mm and the diameter of 12 mm to prepare a thin film of the gelatin solution having the thickness of 1.5 mm. This thin film of the gelatin solution was physically gelated by placing it in the cold place for 10 minutes. This thin film of the gelatin solution was immersed and dialyzed for 20 minutes in the aqueous solution of 25% glutaraldehyde in the incubator kept at 10° C. Then, the above sample was transferred to the incubator at 40° C. Subsequently when the thin film of the gelatin gel was immersed and dialyzed in the aqueous solution of glutaraldehyde, the temperature was changed alternately e.g., 10° C., 40° C., 10° C. and 40° C.

Comparative Example 10

A liquid crystalline gel was obtained in the same way as in Example 22, except that the temperature at which the thin film of the gelatin gel was immersed and dialyzed in the aqueous solution of glutaraldehyde was kept at 10° C. and was not changed.

<Comparison Test 9 and Evaluation>

Figure 14:
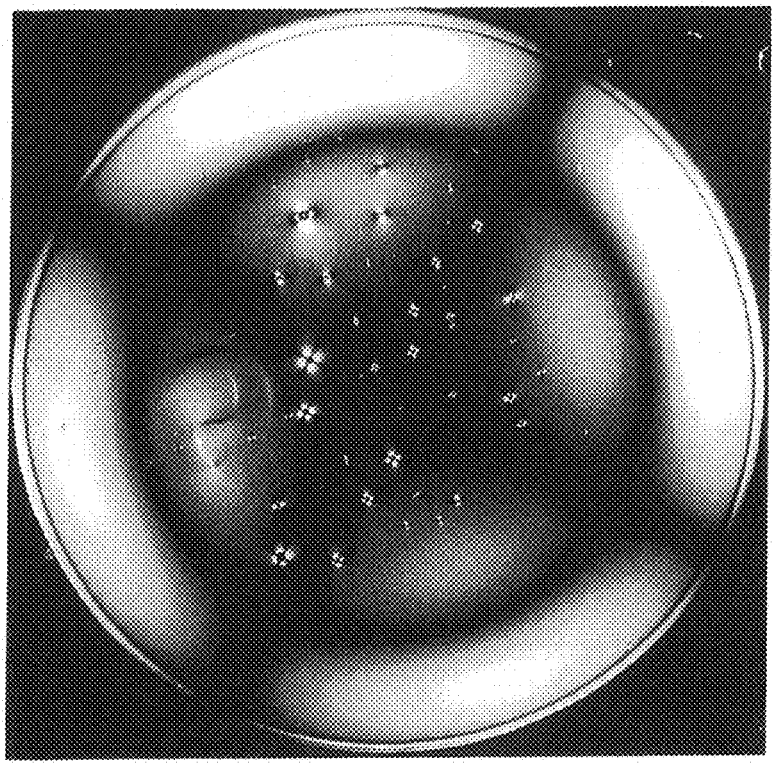
FIG. 14 is a view obtained by observing the liquid crystalline gels of Example 22 and Comparative Example 10 under crossed nicols.
Figure 14:
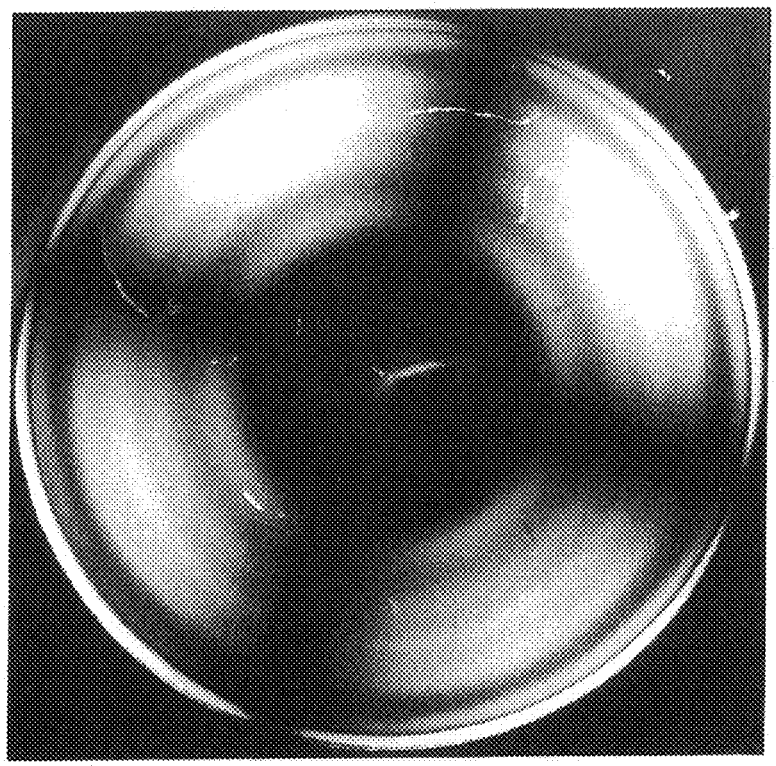

Photos obtained by observing the gelatin gels prepared in Example 22 and Comparative Example 10 under the crossed nicols were shown in FIG. 14. The gelatin liquid crystalline gel prepared in Comparative Example 10 had only two layers whereas the gelatin liquid crystalline gel prepared in Example 22 had the multilayer structure.

INDUSTRIAL APPLICABILITY

The liquid crystalline gel applied by the present applicant and prepared by dialysis or immersion in the aqueous solution of the metal cation is formed by the physical bond between the ion and the polymer. On the contrary, the liquid crystalline gel provided by the present invention is formed by the covalent bond between the chemical crosslinking agent and the polymer. This is a novel point. Therefore, it became possible to prepare the various liquid crystalline gels by designing the combination of the appropriate polymer with the chemical crosslinking agent. For example, it is possible to easily produce the display instrument having the birefringence gradient by forming a main chain type liquid crystal polymer using the process for producing the liquid crystalline gel of the present invention.

The invention claimed is:

1. A process for producing a gel comprising a step of dissolving a water-soluble polymer in water or an aqueous solution containing a salt(s) to prepare a water-soluble polymer solution and a step of dialyzing said polymer solution in an aqueous solution containing a chemical crosslinking agent, thereby obtaining the gel composed mainly of the water-soluble polymer and having a liquid crystal structure;

wherein said water-soluble polymer is one or two or more polymers selected from the group consisting of water-soluble biopolymers, derivatives of these water-soluble biopolymers and water-soluble synthesized polymers, and said water-soluble biopolymers are one or two or more polymers selected from the group consisting of nucleic acids, polysaccharides, proteins, modified proteins and polyamino acids, and said water-soluble synthesized polymers are one or two or more polymers selected from the group consisting of polyvinyl alcohol, polyethylene glycol, polyacrylic acid and polystyrene sulfonic acid;

wherein said chemical crosslinking agent is one or two or more selected from the group consisting of formaldehyde, glutaraldehyde, ethylene glycol diglycidyl ether and epichlorohydrin;

and wherein the step of obtaining said gel having the liquid crystal structure comprises a step of filling and sealing the polymer solution in a dialysis tube composed of a semipermeable membrane, a step of forming a cylindrical gel having a concentric multilayered structure when a cross section perpendicular to a longitudinal direction of the tube is observed, in the tube, by repeating transferring the tube together with the above aqueous solution to a second incubator in which the temperature is kept lower than in a first incubator and dialyzing the polymer solution in the tube in the second incubator and further transferring again the tube together with the above aqueous solution to the first incubator and dialyzing the polymer solution in the tube in the first incubator, after immersing the tube in which the polymer solution has been filled in the aqueous solution containing the chemical crosslinking agent to dialyze the polymer solution in the tube in the first incubator kept at a predetermined temperature and subsequently, and a step of obtaining a solid-core columnar or hollow-core cylindrical gel by taking out the above gel from the tube and rinsing the gel with the water.

2. A process for producing a gel comprising a step of dissolving a water-soluble polymer in water or an aqueous solution containing a salt(s) to prepare a water-soluble polymer solution and a step of dialyzing said polymer solution in an aqueous solution containing a chemical crosslinking agent, thereby obtaining the gel composed mainly of the water-soluble polymer and having a liquid crystal structure;

wherein said water-soluble polymer is one or two or more polymers selected from the group consisting of water-soluble biopolymers, derivatives of these water-soluble biopolymers and water-soluble synthesized polymers, and said water-soluble biopolymers are one or two or more polymers selected from the group consisting of nucleic acids, polysaccharides, proteins, modified proteins and polyamino acids, and said water-soluble synthesized polymers are one or two or more polymers selected from the group consisting of polyvinyl alcohol, polyethylene glycol, polyacrylic acid and polystyrene sulfonic acid;

wherein said chemical crosslinking agent is one or two or more selected from the group consisting of formaldehyde, glutaraldehyde, ethylene glycol diglycidyl ether and epichlorohydrin;

and wherein the step of obtaining said gel having the liquid crystal structure comprises a step of forming a spherical gel by dropping the polymer solution into the aqueous solution containing the chemical crosslinking agent using a syringe, a nozzle or a micropipette to form a semipermeable membrane on all circumferences of a droplet in a first incubator kept at a predetermined temperature, and a step of forming a spherical gel having a concentric multilayered structure when a diameter cross section is observed, by repeating transferring said spherical gel together with said aqueous solution to a second incubator in which the temperature is kept lower than in a first incubator to dialyze the polymer solution in said spherical gel in said second incubator and subsequently transferring again said spherical gel together with said aqueous solution to said first incubator to dialyze the polymer solution in said spherical gel in said first incubator.

3. A process for producing a gel comprising a step of dissolving a water-soluble polymer in water or an aqueous solution containing a salt(s) to prepare a water-soluble polymer solution and a step of dialyzing said polymer solution in an aqueous solution containing a chemical crosslinking agent, thereby obtaining the gel composed mainly of the water-soluble polymer and having a liquid crystal structure;

wherein said water-soluble polymer is one or two or more polymers selected from the group consisting of water-soluble biopolymers, derivatives of these water-soluble biopolymers and water-soluble synthesized polymers, and said water-soluble biopolymers are one or two or more polymers selected from the group consisting of nucleic acids, polysaccharides, proteins, modified proteins and polyamino acids, and said water-soluble synthesized polymers are one or two or more polymers selected from the group consisting of polyvinyl alcohol, polyethylene glycol, polyacrylic acid and polystyrene sulfonic acid;

wherein said chemical crosslinking agent is one or two or more selected from the group consisting of formaldehyde, glutaraldehyde, ethylene glycol diglycidyl ether and epichlorohydrin;

and wherein the step of obtaining said gel having the liquid crystal structure comprises a step of dropping said polymer solution on a first flat plate and then flattening the dropped polymer solution by being covered with another second flat plate, a step of forming a platy or film-like gel between said first and second flat plates, having a concentric multilayered structure wherein the polymer is radially oriented from the center in each layer when a plate surface or a film surface is observed, by repeating transferring said platy or film-like gel together with said aqueous solution to a second incubator in which the temperature is kept lower than in a first incubator to dialyze the polymer solution in said platy or film-like gel in said second incubator and further transferring again said platy or film-like gel together with said aqueous solution to said first incubator to dialyze the polymer solution in said platy or film-like gel in said first incubator, after forming the platy or film-like gel by immersing the polymer solution sandwiched with said first and second flat plates in the aqueous solution containing said chemical crossing agent to form a semipermeable membrane on a part of said polymer solution not covered with said first and second flat plates in the first incubator kept at a predetermined temperature, and a step of obtaining the platy or film-like gel by taking out said gel from said first and second flat plates and rinsing the gel with the water.

4. A process for producing a gel comprising a step of dissolving a water-soluble polymer in water or an aqueous solution containing a salt(s) to prepare a water-soluble polymer solution and a step of dialyzing said polymer solution in an aqueous solution containing a chemical crosslinking agent, thereby obtaining the gel composed mainly of the water-soluble polymer and having a liquid crystal structure;
wherein said water-soluble polymer is one or two or more polymers selected from the group consisting of water-soluble biopolymers, derivatives of these water-soluble biopolymers and water-soluble synthesized polymers, and said water-soluble biopolymers are one or two or more polymers selected from the group consisting of nucleic acids, polysaccharides, proteins, modified proteins and polyamino acids, and said water-soluble synthesized polymers are one or two or more polymers selected from the group consisting of polyvinyl alcohol, polyethylene glycol, polyacrylic acid and polystyrene sulfonic acid;
wherein said chemical crosslinking agent is one or two or more selected from the group consisting of formaldehyde, glutaraldehyde, ethylene glycol diglycidyl ether and epichlorohydrin;
and wherein the step of obtaining said gel having the liquid crystal structure comprises a step of forming a rod-like or fibrous gel by pushing out said polymer solution into the aqueous solution containing the chemical crosslinking agent using a syringe or a nozzle to form a semipermeable membrane on all circumferences of a rod-like or fibrous body in a first incubator kept at a predetermined temperature, a step of forming a rod-like or fibrous gel having a concentric multilayered structure when a cross section perpendicular to a longitudinal direction is observed, by repeating transferring said rod-like or fibrous gel together with said aqueous solution to a second incubator in which the temperature is kept lower than in a first incubator to dialyze the polymer solution in said rod-like or fibrous gel in said second incubator and subsequently transferring again said rod-like or fibrous gel together with said aqueous solution to said first incubator to dialyze the polymer solution in said rod-like or fibrous gel in said first incubator, and a step of obtaining a solid-core or hollow rod-like or fibrous gel by taking out said gel from said aqueous solution and rinsing the gel with the water.

5. The process for producing the gel according to any one of claim 1, 2, 3 or 4 wherein a concentration of the chemical crosslinking agent in the aqueous solution containing the chemical crosslinking agent is 0.1% by weight or higher and the concentration equal to or lower than its saturation concentration.

6. A gel produced by the process according to any one of claim 1, 2, 3, or 4 having a cylindrical, spherical, platy, film-like, rod-like or fibrous liquid crystal structure composed of a water-soluble polymer.

7. The gel having the liquid crystal structure according to claim 6 wherein when the gel includes a protein, said protein is myosin, gelatin or collagen, the polysaccharide is curdlan or chitosan and the nucleic acid is DNA or RNA.

8. The gel having the liquid crystal structure according to claim 6, which is formed into a cylindrical, rod-like or fibrous shape, wherein the polymer is radially oriented from the center when a cross section perpendicular to a longitudinal direction is observed.

9. The gel having the liquid crystal structure according to claim 8 having a concentric multilayered structure when a cross section perpendicular to the longitudinal direction is observed.

10. The gel having the liquid crystal structure according to claim 6 which is formed into a spherical shape, wherein the polymer is radially oriented from the center when a diameter cross section is observed.

11. The gel having the liquid crystal structure according to claim 10 having a concentric multilayered structure when the diameter cross section is observed.

12. The gel having the liquid crystal structure according to claim 6, which is formed into a platy or film-like shape, wherein the polymer is radially oriented from the center when a plate surface or a film surface is observed.

13. The gel having the liquid crystal structure according to claim 12 having a concentric multilayered structure when a plate surface or a film surface is observed.

14. The process for producing the gel according to any one of claim 1, 2, 3 or 5 wherein when the gel includes a protein, said protein is myosin, gelatin or collagen, the polysaccharide is curdlan or chitosan and the nucleic acid is DNA or RNA.

* * * * *